FIG. I.
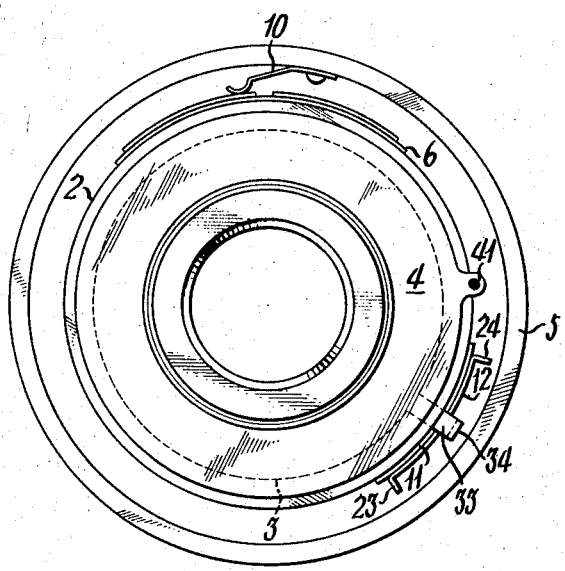
FIG. 4.
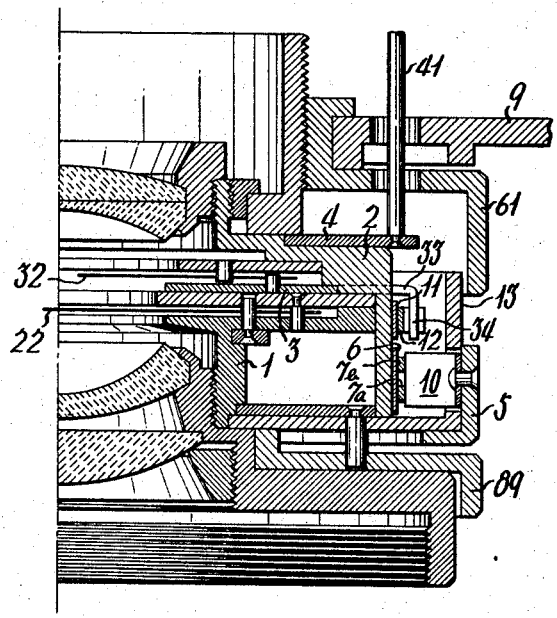

March 25, 1969  TATSUO KOBAYASHI ET AL  3,434,404
AUTOMATIC DIAPHRAGM SETTING SYSTEM FOR FLASH PHOTOGRAPHY
Filed April 13, 1966  Sheet 3 of 3

INVENTORS
TATSUO KOBAYASHI & TOSHINOBU IMURA
BY Mason, Fenwick & Lawrence
ATTORNEYS United States Patent Office 3,434,404
Patented Mar. 25, 1969

3,434,404
AUTOMATIC DIAPHRAGM SETTING SYSTEM FOR FLASH PHOTOGRAPHY
Tatsuo Kobayashi and Toshinobu Imura, Osaka, Japan, assignors to Minoltacamera Kabushiki Kaisha, Osaka, Japan, a corporation of Japan
Filed Apr. 13, 1966, Ser. No. 542,274
Claims priority, application Japan, Apr. 14, 1965, 40/22,039
Int. Cl. G01j 1/52
U.S. Cl. 95—10               4 Claims

ABSTRACT OF THE DISCLOSURE

An automatic diaphragm setting system in which movement of a camera rangefinder adjusts the diaphragm aperture in accordance with the guide number being employed and including a control circuit for completing a circuit to an exposure meter to cause the exposure meter to indicate that the required diaphragm opening is within the diaphragm opening range capability of the camera when such is the case and for activating the exposure meter in another manner to indicate that the range has been adjusted to a value requiring a diaphragm opening beyond the capability of the diaphragm of the camera when such is the case.

---

This invention relates to an automatic diaphragm setting system for cameras employing flash photography and is particularly related to an automatic diaphragm setting system for use in a camera having an electric exposure meter and focusing means for focusing the camera for various subject to camera distances. The diaphragm setting means cooperates with the focusing means to provide a correct diaphragm opening in accordance with the guide member of the particular type of flash bulb being used and the particular type of film being used; however, the camera exposure meter provides a visual indication to the photographer when the range requires a diaphragm opening either greater than, or less than, the camera's capacity. This fact is made evident to the user of the camera by virtue of a warning provided in the exposure meter built into the camera. This warning advises the operator that the required diaphragm is beyond the capability of the camera. However, when the object being photographed is within the required range and diaphragm capability of the camera, the pointer in the light meter moves to a fixed point to indicate that the diaphragm value required is within the proper range and capability of the camera. Moreover, the subject invention also serves to check the battery operating the exposure meter.

A particular object of this invention is to make it possible to focus the camera at all times without the need for making mental calculations to determine if the resultant photograph will be of optimum quality.

The principles of the invention having the described features and advantages will become apparent from the following description of the invention and the accompanying drawings illustrative thereof in which:

FIG. 1 is a front elevational view showing the essential elements of an embodiment of the subject invention;

FIG. 4 is a plan view of a body tube cut away in a horizontal direction;

Figure 2:
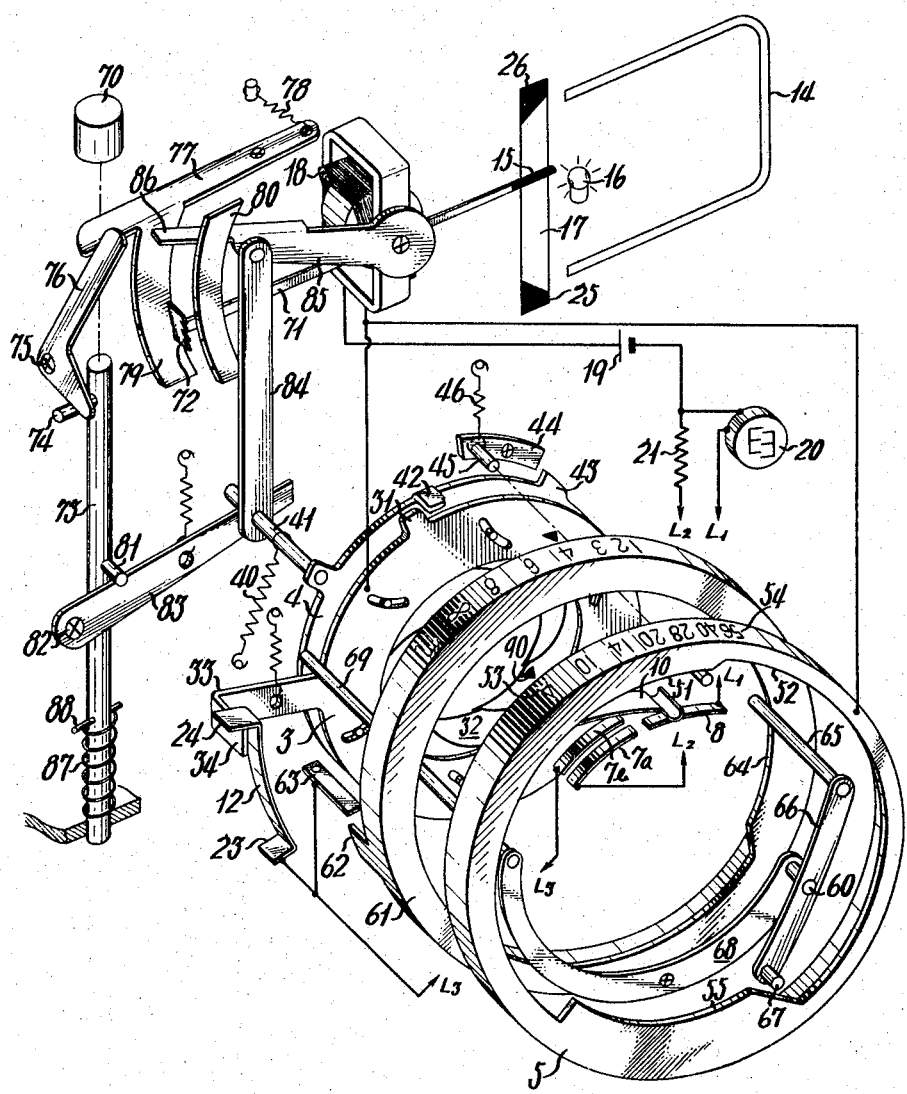
FIG. 2 is a perspective view showing the entirety of the device of the subject invention.
Figure 3:
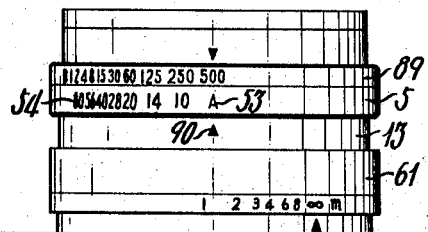
FIG. 3 is a top plan showing the appearance of a camera embodying the principles of the subject invention.

Attention is initially invited to FIGURES 1–4 which illustrate the preferred embodiment of the invention. The preferred embodiment includes a shutter ring 1 assembly in combination with a shutter housing ring 2 which contains a conventional shutter mechanism 22. The shutter mechanism 22 is associated with a diaphragm setting ring 3 for adjusting diaphragm vanes 32. An abutment 31 extends outwardly from the diaphragm setting ring 3 as shown in FIGURE 2. The rear end of the shutter housing ring 2 provides a rotatable support for an operation member 4 which adjusts the amount of rotation and position of the diaphragm setting 3. The operation member 4 is provided with an abutment 42 engageable with abutment 31 and is also provided with another projection 43 to be discussed hereinafter. A pin 45 is supported and connected on one end to a pivotal lever 44 and extends adjacent projection 43 to be engaged by the projection when pivoted in the path thereof. Moreover, pin 45 extends forwardly a sufficient distance to lie in the path of movement of a pair of cam faces 51 and 52 extending inwardly on the inner circumference of a diaphragm adjusting ring 5, which is rotatably supported on a stationary bearing portion of a body tube 13 (FIG. 4). Operation member 4 has an operation pin 41 attached thereto to extend rearwardly into the camera body 9 as shown in FIGURES 2 and 4. The operation pin 41 extends inwardly and is engaged on its lower edge by a spring biased follow lever 83 that moves in cooperation with a release rod 73 which is moved downwardly by means of a release button 70 of the shutter control. A connecting bar 84 is also connected to operation pin 41. The upper end of connecting bar 84 is connected to a control lever 85 for positioning in accordance with the pivotal swinging positioning of a pointer 15 of an exposure meter 18. A pin 67 is attached to one end of a pivot lever 66 pivotally supported at 60 on arcuate lever 68 so that pin 67 is engageable by cam 55 formed on the inner circumference of the diaphragm adjusting ring 5. The other end of pivot lever 66 is provided with a traverse pin 65 engageable with a cam 64 formed on the inner circumference of a speed setting ring 61. The speed setting ring 61 is adjustable for various guide numbers and for automatic non-flash photography. The pivotally mounted arcuate lever 68 is connected at one end to the pivot 60 of the lever 66 and has its other end connected to a horizontally extending lever 69 extending rearwardly past the diaphragm setting ring 3, so that rotary movement can be imparted to ring 3 by movement of lever 69.

Electrical contact segments 7a, 7b and 8 are supported by a layer of insulation material on the outer circumference of the shutter housing ring 2 to be engaged by a spring contact 10. Spring contact 10 is attached by a layer of insulation to the interior circumference of the diaphragm adjusting ring 5 as shown in FIGURE 4. The outer circumference of the shutter housing ring 2 has a double headed contact segment 12 with two limit contacts 23 and 24 respectively formed on each end thereof for engagement by a warning contact 34 formed on the extreme end of arm 33 radially extending from the diaphragm setting ring 3 as clearly illustrated in FIGURE 2.

Figure 5:
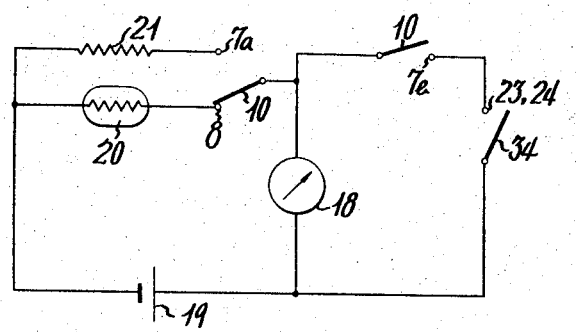
FIGS. 5 and 6 are schematic electrical diagrams of the embodiment of the subject invention.

FIGURE 5 illustrates electrical control circuit employed in the preferred embodiment. The control circuit includes an exposure meter 18, a battery 19 and a photoelectric element 20 of conventional design. A contact segment 7a is connected through a resistor 21 so as to be parallel with the photoelectric elements 20. The contact segment 7a is employed for flash photography by connection to spring contact 10. Moreover, contact segment 8 for use when non-flash photography is provided for connection to the meter by means of a spring contact 10 as shown in FIGURE 5. Spring contact 10 can be moved to either a position engaging contact 7a or engaging contact 8 (see FIG. 2), in accordance with the mode of operation desired. It should be noted that contacts 7a and 7b are simultaneously contacted by spring contact 10 as shown in FIGURE 2. However, spring contact 10 merely engages contact 8 in its other position of operation. The other position of operation is for non-flash photography as was noted previously.

When it is desired to automatically fix the proper exposure value in the camera, an automatic exposure designator 53 in the form of an "A" inscribed on the diaphragm adjusting ring 5 is moved into an aligned position with a fixing point 90 on the body tube 13. This movement causes pin 45 to ride cam face 51 so that lever 44 is pivoted in a counter clockwise direction illustrated in FIGURE 2 so as to have its end positioned so as to avoid engagement with protrusion 43 of the operation ring 4. Subsequent depression of release buton 70 for the shutter results in downward movement of rod 73. This movement of rod 73 causes a lever 76 supported by fixed pivot 75 to be rotated forwardly in FIGURE 2 by a second pivoted lever 77. The rotation of levers 76 and 77 is caused by the biasing force of a spring 78 engaging one end of lever 77 in an obvious manner as shown in FIGURE 2. The pointer 15 in the exposure meter 18 will be positioned in a position proportionate to the amount of light coming from a photographic object into the photoelectric element 20. Consequently, the end of pointer 15 will be positioned at some point within the extent of a mark 17 (FIG. 2) to indicate a proper exposure. The end of pointer 15 is visible in a finder 14. The tail end 72 of a pointer rod 71 is positioned between a press member 79 located forwardly adjacent lever 77 and a fixed plate 80. Pointer rod 71 is merely a rearward extension past the pivot of pointer 15. Rod 73 is also provided with a forward extending horizontal pin 81 which engages a pivot lever 83 supported by a fixed pivot 82. The operation of pin 41 is biased by an operation spring 40 to rotate the operation spring 4 in a counter clockwise direction in FIGURE 2 by virtue of the connection of pin 41 to the operation ring 44. However, since the operation pin 41 is also connected through connecting bar 84 to a control lever 85, it can only rotate counter clockwise until the tail end 86 of the control lever 85 abuts against the tail end 72 of the pointer 15 which is clamped in position by press member 79 and plate 80. Counter clockwise rotation of member 4 causes abutment 42 to engage abutment 31 of the diaphragm setting ring 3 to cause the diaphragm setting ring 3 to rotate in a counter clockwise direction to an angle equal to the angle of rotation of the operation ring 4. Rotation of focusing ring 61 while the camera is being focused causes a cam 64 to press against the traverse pin 65. However, since pin 67 on the end of lever 66 is disengaged from cam 55, horizontal pin 69 does not actuate the diaphragm setting ring 33.

It should be noted that when any of the guide numbers 54 inscribed on the diaphragm adjusting ring 5 are moved to a position in which any one of said guide numbers is in agreement with a fixing point 90 on the body tube 13, the pin 45 drops into engagement with a cam face 52 and lever 44 is in alignment with a protrustion 43 of the operation member 4. But the pin 67 of the lever 66 has ridden on the cam 55 and accordingly when the traverse pin 65 is pushed by cam 64 in response to operation of a focusing ring 6, the arcuate lever 68 is moved to make it possible for horizontal pin 69 to actuate the diaphragm setting ring 3.

Figure 7:
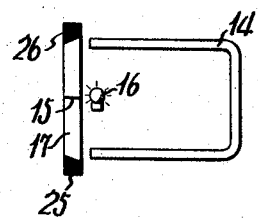
FIG. 7 is an example of a frame of a view within the finder.

Operation of the preferred embodiment for non-flash photography in which the exposure is automatically set is enabled by the movement of designator 53 on the diaphragm adjustment ring 5 into alignment with the fixing point 90 on the body tube 13 as was noted previously. This movement causes contact segment 8 and contact 10 to engage to provide the circuit illustrated in FIGURE 5. Consequently, a circuit from meter 18 through battery 19 to the photoelectric element 20 is completed and the pointer 15 of the meter 18 is positioned in accordance with the quantity of light impinging upon the photoelectric element 20. When the position of the pointer is within the proper range of mark 17 of the frame 14 illustrated in FIGURE 7, the diaphragm setting ring 3 is moved by pin 41, cam 42 etc. The focusing ring 61 can rotate along its entire extent for adjusting to achieve the proper focus. However, on the other hand, if the pointer 15 points toward one of the warning marks 25 or 26 illustrated in FIGURE 2 and FIGURE 7, the camera operator is aware that the shutter speed value must be changed.

Operation of the preferred embodiment of flash photography is initiated by positioning a guide number 54 on the diaphragm adjusting ring 5 in alignment with the fixing point 90 on the body 13. Such positioning causes contact segments 7a and 7b to be engaged by the contact 10 and also causes pin 67 to ride upwardly on cam 55. Consequently, operation of focusing ring 61 actuates the diaphragm setting ring 3 by means of horizontal pin 69 to consequently open either contact 23 or 24 and contact 34 as shown in FIGURE 5. Also, a check circuit leading from meter 18 through battery 19 to fixed resistor 21 is simultaneously closed. At this time, the pointer 15 of meter 18 is positioned in proportion to the voltage of battery 19 and the position of the pointer is consequently indicative of whether or not the battery is functionally effective.

If the distance between the camera and the object being photographed is such that the required diaphragm opening is within the range of the diaphragm, the pointer 15 of the meter 18 is positioned in the middle of a lamp mark 16 indicative that the distance is within the adjustable range of the diaphragm. Focusing of the camera results in movement of diaphragm ring 3 for setting diaphragm ring 32 by means of the horizontal pin 69. However, when the distance between the camera and the object being photographed, exceeds the limit point of the adjustable ring of the diaphragm and the diaphragm rings are open at their maximum aperture position or are closed to their minimum aperture position, contact 34 of the diaphragm setting ring engages either contact 23 or 24 of the double headed contact segment 12. This results in the closure of the by-pass circuit from battery 19 to resistor 21, contact segment 7a, contact 10, contact segment 7b, contact 23 or 24 and contact 34. In such a case, the inner resistance of the meter 18 is much greater than the circuit resistance by the by-pass circuit and current flows from contact 10 through segment 7b, contact 23 or 24 to contact 34 and consequently, current flowing through meter 18 drops to an inappreciable amount. Accordingly, the pointer 15 of the meter 18 will be positioned within warning mark 26 to thus indicate that the adjustable range of the diaphragm has been exceeded. However, the photographer can still proceed with the taking of a picture if he desires to do so.

Figure 6:
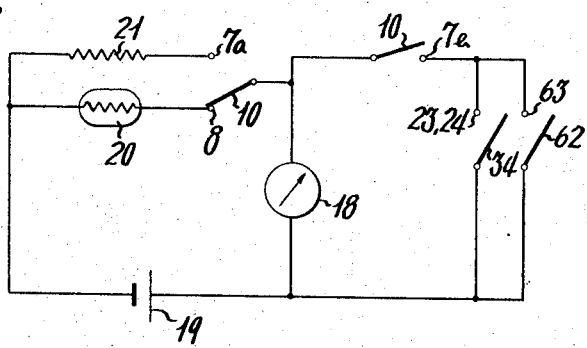

FIGURE 6 illustrates a modification of the circuit shown in FIGURE 5. The modification is also employed with the components illustrated in FIGURE 2 and includes the provision of providing contacts 62 and 63 in parallel connection with respect to the by-pass circuit contacts 23, 24 and 34 as shown in FIGURE 6. A cam 64 is formed within the periphery of focusing ring 61. A protruding contact 62 extends from focusing ring 61 to engage a contact 63 at a predetermined focus distance. For example, contacts 62 and 63 can be positioned so that they engage each other through a complete circuit when the ring 61 is focused at a distance greater than ten meters for example. Engagement of contacts 62 and 63 creates another by-pass circuit having the same effect as discussed previously in regard to the pointer 15 of the meter 18 which immediately is positioned within the warning mark 26 upon engagement of the contacts 62 and 63. For example, assume that a guide number is set at a relatively large value such as 80, and the diaphragm setting value does not exceed f/2, it is obvious that flash pictures can be taken in up to a distance of forty feet as determined by dividing the diaphragm setting into the guide number. However, automatic flash control means cannot normally secure precision adjustment as such a long distance and the mechanism of this invention works as a mechanism for limiting the range of use to shorter distances.

It should be understood that this invention should not be limited by the embodiments illustrated herein and that many modifications will occur to those skilled in the art. For example, it would be possible to employ an indicator scale and exposure meter located outside the camera body. Moreover, the system of the subject invention can also be incorporated in a meter scale to issue a warning in an electric eye camera.

What is claimed is:

1. An automatic diaphragm setting system for flash photography for use with a camera having means for adjusting the diaphragm aperture in accordance with the focused range of a focusing ring of the camera, said system including a shutter housing ring, a diaphragm adjusting ring movable between an automatic exposure control position for non-flash photography and plural number positions for flash photography, a spring contact attached to said diaphragm adjusting ring, two contacts supported by said shutter housing ring to be engageable by said spring contact when said diaphragm adjusting ring is in one of said guide number positions for flash photography. An exposure meter with a movable pointer, a battery and photoelectric element for said exposure meter, a contact segment having outwardly extending limit contacts at each end, a rotatable diaphragm setting ring, a warning contact extending outwardly from said diaphragm setting ring and mounted for movement between said limit contacts and circuit means connecting said contacts for completing a by-pass circuit past said exposure meter when said warning contact engages either of said limit contacts to cause the meter pointer to move to a warning position indicative that the focused range setting of the camera requires a diaphragm setting not within the adjustable range of the diaphragm for the particular guide member being employed.

2. The invention of claim 1 additionally including a movable contact mounted on the focusing ring for engaging a fixed contact to cause the meter pointer to move to a warning position when the focused range exceeds a predetermined amount.

3. The invention of claim 1 wherein said circuit means includes conductors connecting a resistor in series with the meter and battery when said diaphragm adjusting ring is in a guide number position and alternatively connecting a photoelectric element in series with said meter and said battery when said diaphragm adjusting ring is in its automatic exposure control position for non-flash photography.

4. The invention of claim 1 wherein said circuit means includes conductors creating a circuit through said meter causing the pointer to align with an indicator when the required diaphragm setting for the focused range is within the adjustable ring of the diaphragm.

References Cited

UNITED STATES PATENTS

| | | | |
|---|---|---|---|
| 3,118,356 | 1/1964 | Sauer et al. | 95—10 |
| 3,147,680 | 9/1964 | Stimson | 95—10 |
| 3,228,314 | 1/1966 | Köppen | 95—44 XR |
| 3,285,149 | 11/1966 | Fahlenberg et al. | 95—10 |
| 3,314,343 | 4/1967 | Rentschler | 95—10 |
| 3,326,107 | 6/1967 | Rentschler | 95—10 XR |

NORTON ANSHER, *Primary Examiner.*

JOSEPH F. PETERS, Jr., *Assistant Examiner.*

U.S. Cl. X.R.

95—44, 64.